US010791195B2

(12) United States Patent
Chen

(10) Patent No.: US 10,791,195 B2
(45) Date of Patent: Sep. 29, 2020

(54) COMMON DEVICE INTERFACE FRAMEWORK FOR IOT/SMART DEVICE APPLICATION

(71) Applicant: Miaobo Chen, Shanghai (CN)

(72) Inventor: Miaobo Chen, Shanghai (CN)

( * ) Notice: Subject to any disclaimer, the term of this patent is extended or adjusted under 35 U.S.C. 154(b) by 75 days.

(21) Appl. No.: 15/193,911

(22) Filed: Jun. 27, 2016

(65) Prior Publication Data

US 2017/0374155 A1    Dec. 28, 2017

(51) Int. Cl.
*H04L 29/08* (2006.01)
*H04W 4/50* (2018.01)
*G06F 8/36* (2018.01)

(52) U.S. Cl.
CPC .............. *H04L 67/303* (2013.01); *G06F 8/36* (2013.01); *H04L 67/16* (2013.01); *H04W 4/50* (2018.02)

(58) Field of Classification Search
USPC ......................................................... 709/221
See application file for complete search history.

(56) References Cited

U.S. PATENT DOCUMENTS

| | | | | |
|---|---|---|---|---|
| 9,552,226 B1* | 1/2017 | Norbeck, Jr. | ............. | G06F 9/54 |
| 2006/0123125 A1* | 6/2006 | Weisman | ................ | H04L 29/06 709/227 |
| 2012/0303832 A1* | 11/2012 | Raschke | ............. | H04L 12/2809 709/230 |

* cited by examiner

*Primary Examiner* — Hermon Asres
(74) *Attorney, Agent, or Firm* — Rimon PC

(57) ABSTRACT

A software framework and computer implemented method for providing a uniform abstract representation of the smart devices and internet of things application.

The framework/method utilizes the invented device object that comprises a unified Device Abstract Interface, a hardware profile and an application profile that comprises of a list of associated services and the state of each service.

The framework/method performs a genuine abstract method to translate the diverse interfaces of device hardware into a common device application profile. All hardware details of each device can be contained within the common device application profile to achieve a uniform representation of device seen from outside of the framework.

Currently, the common device application profile is implemented in JSON (JavaScript Object Notation) format and can be acquired by clients from framework's RESTful (REST: representational state transfer) interface. A client app can access and control the device through a uniform interface of the framework with standard web technologies. This design and common device application profile can be applied to any smart devices in a computer network, in particular, the internet of things and smart home application.

A software framework and computer implemented method for providing a uniform abstract representation of the smart devices and internet of things application.

The framework/method utilizes the invented device object that comprises a unified Device Abstract Interface, a hardware profile and an application profile that comprises of a list of associated services and the state of each service.

The framework/method performs a genuine abstract method to translate the diverse interfaces of device hardware into a common device application profile. All hardware details of each device can be contained within the common device application profile to achieve a uniform representation of device seen from outside of the framework.

Currently, the common device application profile is implemented in JSON (JavaScript Object Notation) format and can be acquired by clients from framework's RESTful (REST: representational state transfer) interface. A client app can access and control the device through a uniform interface of the framework with standard web technologies.

(Continued)

a modeling diagram depicting an embodiment of the invented software framework (M200) working with smart devices.

This design and common device application profile can be applied to any smart devices in a computer network, in particular, the internet of things and smart home application.

13 Claims, 15 Drawing Sheets

FIG. 1 is a modeling diagram depicting an embodiment of the invented software framework (M200) working with smart devices.

FIG. 2 is a modeling diagram depicting an embodiment of high level functions of the software framework.

FIG 3, is a modeling diagram depicting an embodiment of high level architecture of the software framework, further comprising of a set of interfaces and modules.

FIG. 4 is a modeling diagram depicting an embodiment of hierarchical layout of the framework deployment, in accordance with an embodiment of the present invention.

FIG. 5 is a modeling diagram depicting an embodiment of Device (M100) object managed by the framework.

FIG. 6 is a modeling diagram depicting an embodiment of Device's application profile (M110), implemented in JSON format.

FIG. 7 is an embodiment of JSON document which represents a switchable light bulb's application profile.

```json
{
  "configId": 1,
  "specVersion": {
    "major": 1,
    "minor": 0
  },
  "device": {
    "deviceType": "urn:cdif-net:device:DimmableLight:1",
    "friendlyName": "Yeelight Blue",
    "manufacturer": "Yeelight Inc",
    "manufacturerURL": "http://www.yeelight.com",
    "modelDescription": "Yeelight Blue BLE lightbulb",
    "modelName": "Yeelight Blue",
    "modelNumber": "Yeelight Blue",
    "UPC": "1234",
    "userAuth": false,
    "powerIndex": 40,
    "iconList": [
      {
        "mimetype": "image/png",
        "width": 80,
        "height": 100,
        "depth": 16,
        "url": "http://www.yeelight.com/yb.png"
      }
    ],
    "serviceList": {
      "urn:cdif-net:serviceID:BinarySwitch": {
        "serviceType": "urn:cdif-net:service:SwitchPower:1",
        "actionList": {
          "getState": {
            "argumentList": {
              "stateValue": {
                "direction": "out",
                "retval": true,
                "relatedStateVariable": "state"
              }
            }
          },
          "setState": {
            "argumentList": {
              "stateValue": {
                "direction": "in",
                "relatedStateVariable": "state"
              }
            }
          }
        },
        "serviceStateTable": {
          "state": {
            "sendEvents": true,
            "dataType": "boolean",
            "defaultValue": true
          }
        }
      }
    }
  }
}
```

FIG. 7

FIG. 8 is an embodiment of JSON document which represents a switchable and dimmable light bulb's application profile with two services: a BinarySwitch service and a Dimmable service.

```
{
  "configId": 1,
  "specVersion": {
    "major": 1,
    "minor": 0
  },
  "device": {
    "deviceType": "urn:cdif-net:device:DimmableLight:1",
    "friendlyName": "Yeelight Blue",
    "manufacturer": "Yeelight Inc",
    "manufacturerURL": "http://www.yeelight.com",
    "modelDescription": "Yeelight Blue BLE lightbulb",
    "modelName": "Yeelight Blue",
    "modelNumber": "Yeelight Blue",
    "UPC": "1234",
    "userAuth": false,
    "powerIndex": 40,
    "iconList": [
      {
        "mimetype": "image/png",
        "width": 80,
        "height": 100,
        "depth": 16,
        "url": "http://www.yeelight.com/yb.png"
      }
    ],
    "serviceList": {
      "urn:cdif-net:serviceID:BinarySwitch": {
        "serviceType": "urn:cdif-net:service:SwitchPower:1",
        "actionList": {
          "getState": {
            "argumentList": {
              "stateValue": {
                "direction": "out",
                "retval": true,
                "relatedStateVariable": "state"
              }
            }
          },
          "setState": {
            "argumentList": {
              "stateValue": {
                "direction": "in",
                "relatedStateVariable": "state"
              }
            }
          }
        },
        "serviceStateTable": {
          "state": {
            "sendEvents": true,
            "dataType": "boolean",
            "defaultValue": true
          }
        }
      },
      "urn:cdif-net:serviceID:Dimming": {
        "serviceType": "urn:cdif-net:service:Dimming:1",
        "actionList": {
          "setLoadLevelState": {
            "argumentList": {
              "newLoadLevelState": {
                "direction": "in",
                "relatedStateVariable": "loadLevelState"
```

Fig. 8A

```
            }
          }
        },
        "getLoadLevelState": {
          "argumentList": {
            "loadLevelState": {
              "direction": "out",
              "retval": true,
              "relatedStateVariable": "loadLevelState"
            }
          }
        },
        "setOnEffectLevel": {
          "argumentList": {
            "newOnEffectLevel": {
              "direction": "in",
              "relatedStateVariable": "onEffectLevel"
            }
          }
        },
        "getOnEffectLevel": {
          "argumentList": {
            "onEffectLevel": {
              "direction": "out",
              "retval": true,
              "relatedStateVariable": "onEffectLevel"
            }
          }
        }
      },
      "serviceStateTable": {
        "loadLevelState": {
          "sendEvents": true,
          "dataType": "number",
          "allowedValueRange": {
            "minimum": 0,
            "maximum": 100,
            "step": 1
          },
          "defaultValue": 100
        },
        "onEffectLevel": {
          "sendEvents": false,
          "dataType": "number",
          "allowedValueRange": {
            "minimum": 0,
            "maximum": 100,
            "step": 1
          },
          "defaultValue": 100
        }
      }
    }
  }
}
```

FIG. 8B

FIG. 9 is a modeling diagram depicting an embodiment of Device Driver (M150), further comprising of a set of device objects.

FIG. 10 is a flowchart of acts performed by the framework in discovering and registering a smart device, in accordance with an embodiment of the present invention.

FIG. 11 is a modeling diagram depicting an example of how the framework to deliver a common abstract interface for the smart device.

FIG. 12 is a flowchart of acts performed by the client app and the framework, interacting and controlling the smart device, in accordance with an embodiment of the present invention.

FIG. 13 is a flowchart of acts performed by a client app to retrieve a JSON schema document (M280) associated with the device object.

FIG. 14 is a flowchart of acts performed by the client app, and framework in interacting to do event subscription and receive event updates from the smart device, in accordance with an embodiment of the present invention.

COMMON DEVICE INTERFACE FRAMEWORK FOR IOT/SMART DEVICE APPLICATION

BACKGROUND

The Internet of Things has the potential to transform industries, as well as the way we live and work. There have been rapid advancements in technology and application development in the past several years. A lot of new technologies are emerging to enable the connection of "things", also known as, smart device.

There are several competing standards, including Bluetooth, ZWave, ZigBee, or traditional IP networking protocols. Furthermore, different manufacturers might implement additional proprietary protocols and unique features. There is no common interface to interact with those smart devices and IoTs.

It is very inconvenient and costly to consumers who own different brand of smart devices to interact together. The lack of uniform control, access and interoperability among devices from different manufactures deters the quick adoption of IoT application. The lack of uniform representation of a large variety of smart devices and IoTs also poses a challenge to many service providers. They have to spend significant resources and efforts toward building specific interfaces to correspond with different standards, protocols and manufacturers.

Although most manufacturers strive to develop a common interface within their own products, it is still a very fragmented market. There is no common technology or standard to interact and control smart devices among different manufacturers.

Existing technologies and network protocols, such as Bluetooth, Z-Wave, and etc. have all tried to define a common smart device application profile, which describes the device capability with associated services and how to operate those services. However, their defined device application profile only falls into its own protocol and still lacks interoperability across different protocols.

While all device application profiles require some kind of structured data to fully represent the device's capabilities in a tree-like data structure, some technologies, such as ONVIF or UPnP, utilize XML format to represent device application profiles and send action calls in XML SOAP format. However, this XML format data is heavyweight and difficult to use in interaction with client web applications. Furthermore, they utilize more resources both on processing and in communication.

Compared to XML or other structural data format, JSON (JavaScript Object Notation, an open-standard format that uses human-readable text to transmit data objects consisting of attribute-value pairs) data has the same capability to represent the common device application profile in a structural format. Furthermore, it is more readable by human eye, and more easily parsed and analyzed by software such as client side JavaScript and server side Node.js code. Additionally, JSON is more compact and consumes less network bandwidth.

In this invention, we developed a JSON based device application profile far superior to the XML based model. Comparing to existing technologies, it is the best advancement in technology for creating common device application profile for all kinds of IoT devices.

BRIEF DESCRIPTION OF THE DRAWINGS

The drawings are only for purposes of illustrating various embodiments and are not to be construed as limiting, wherein:

FIG. 7 is an embodiment of JSON document which represents a switchable light bulb's application profile.

FIG. 8A is a partial view of an embodiment of JSON document which represents a switchable and dimmable light bulb's application profile with two services: a Binary Switch service and a Dimmable service. The complete view is continued in FIG. 8B.

FIG. 8B is a continuation of the partial view on FIG. 8A of an embodiment of JSON document which represents a switchable and dimmable light bulb's application profile with two services: a Binary Switch service and a Dimmable service.

DETAILED DESCRIPTION

The invention is illustrated by way of example and not by way of limitation in the figures of the accompanying drawings in which like references indicate similar items. References to embodiments in this disclosure are not necessarily to the same embodiment, and such references mean at least one. While specific implementations are discussed, it is understood that this is done for illustrative purposes. A person skilled in the relevant art can recognize that other components and configurations may be used without departing from the scope and spirit of the invention.

In the following description, numerous specific details are set forth to provide a thorough description of the invention. However, it can be apparent to one skilled in the art that the invention may be practiced without these specific details. In other instances, well known features have not been described in details so as not to obscure the invention.

Many IoT/smart devices utilize different network standard and protocols, such as Bluetooth, ZWave, ZigBee, or IP networking protocols. In addition, different manufacturer might implement proprietary protocols and unique features. It is a challenge to achieve uniform representation of large variety of devices, making interoperability between IoT/smart devices very difficult.

Figure 1:
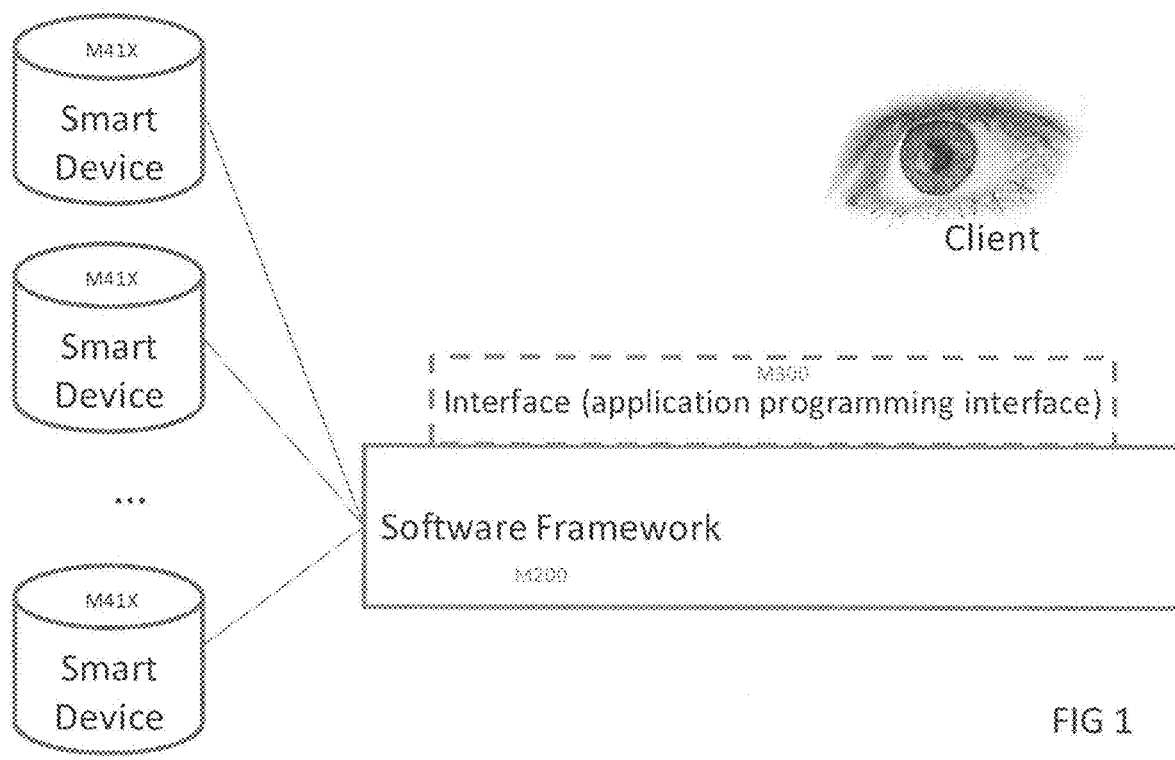
FIG. 1 is a modeling diagram depicting an embodiment of the invented software framework (M200) working with smart devices.

We invented a new solution to meet the challenge, Refer FIG. 1. This solution introduced a software framework (M200) to manage all smart devices (M41X) that are connected to the framework.

Acting as a web server, this framework exposes at least one external interface, named application programming interface (M300) to client outside the framework with uniform format. Through this framework, client can access all smart devices through the common interface (M300) with uniformed commands without the hassles to handle different network protocols and device details.

The following invented framework (M200) can be applied to a Smart Home and Internet of Things (IoT) application. The framework can be implemented as part of the smart gateway, or in a mobile device such as smart phone or tablets, or in a server machine running in the cloud, or in a PC or a connected "smart" networked device behind the firewall that can access the IoT devices through computer network.

Figure 2:
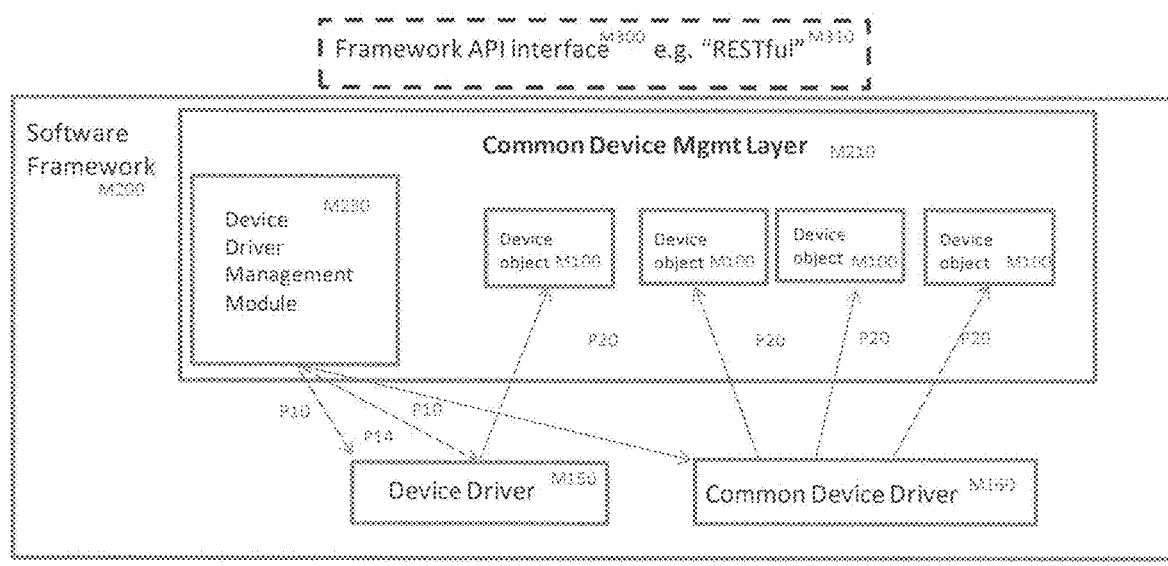
FIG. 2 is a modeling diagram depicting an embodiment of high level functions of the software framework.

FIG. 2 is a modeling diagram depicting an embodiment of high level functions of the invented software framework (M200).

At its top level, it exposes a set of device management API (application programming interface) interface (M300), in our preferred embodiment, we implemented RESTful (M310) style APIs to external world.

Internally, it facilitates with a common device management layer (M210) to manage a set of Device object (M100), which is generated from device driver (M150) and reports to the framework.

The common device management layer (M210) has a device driver management module (M230) to manage all the device drivers, for example, send discovery (P10) request to, load and unload device drivers (P14), and etc.

When a smart device is discovered on the network, the device driver registers (P20) the discovered devices to framework, and represents them as internal device object (M100) in the framework.

Each device object (M100) instance represents a discovered smart device.

External world may get the list of discovered devices through framework's API interface (M300), and control these devices through the APIs interface (M300) implemented by the software framework (M200).

In our current implementation, we use RESTful API (M310) to build framework's API interface (M300).

For smart devices that share the common device driver (M160) within same protocol, you might see multiple device objects that represent different smart devices created from the same Common Device Driver (M160) as shown in FIG. 2.

The framework's interface (M300) also exposes API for device event subscription. To receive device events, external world subscribers send their event subscription request and address information to the framework API interface. When device events reach the framework, the framework sends event updates to the subscriber's address. Subscriber addresses may be any URL, or socket address that is open to receive data. With this design, we create a bi-directional data channel for all kinds of IoT devices.

Figure 3:
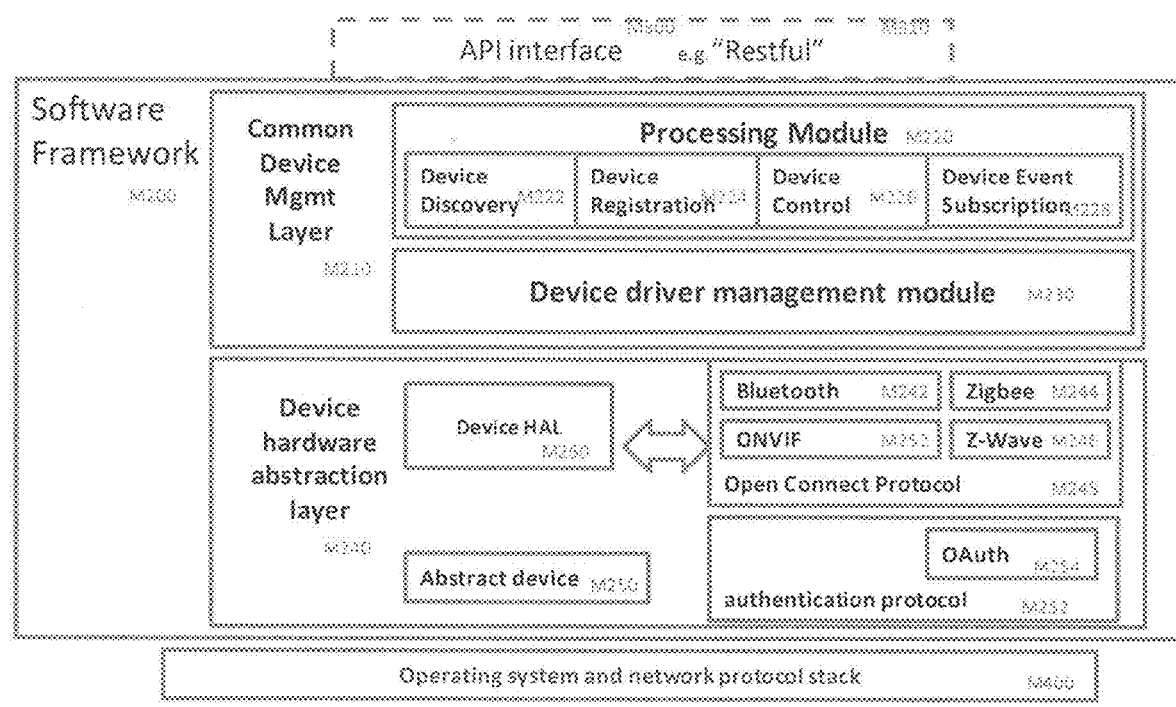
FIG. 3 is a modeling diagram depicting an embodiment of high level architecture of the software framework, further comprising of a set of interfaces and modules.

FIG. 3 is a modeling diagram depicting an embodiment of high level architecture of the framework, further comprising of a set of interfaces and modules.

There are two major layers in the framework on top of the operating system and network protocol stack (M400). Common Device Management Layer (M210) and Device hardware abstraction layer (M240).

Common device management layer (M210) comprises of the Processing Module (M220) and Device Driver Management Module (M230).

The Processing Module is comprised of major functional modules that include at least one of the followings: Device Discovery (M222), Device Registration (M224), Device Control (M226) and Device Event Subscription (M228).

Device Driver Management Module (M230) interface with device drivers (M150 in FIG. 1) for each device object grouped in the Device Hardware Abstraction Layer (M240).

Figure 4:
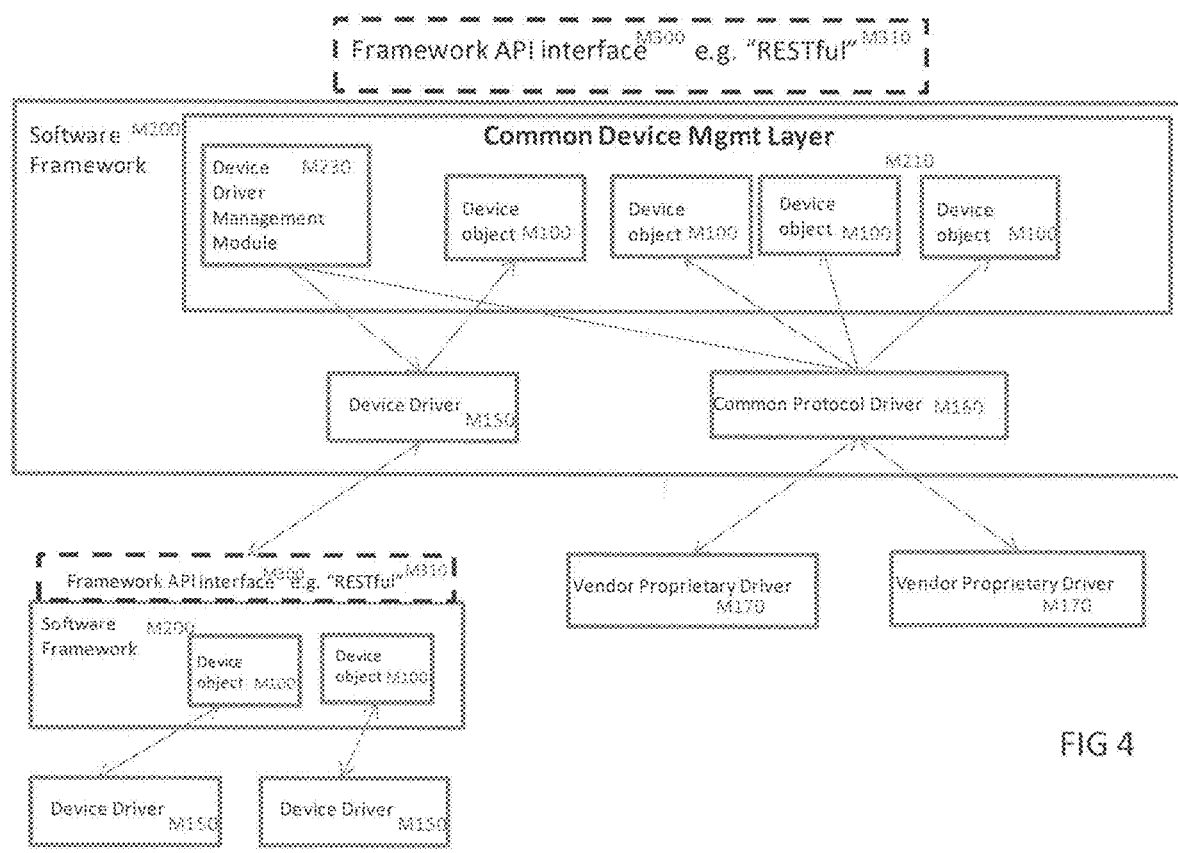
FIG. 4 is a modeling diagram depicting an embodiment of hierarchical layout of the framework deployment, in accordance with an embodiment of the present invention.

FIG. 4 is a modeling diagram depicting the hierarchical layout of the framework deployment, in accordance with an embodiment of the present invention.

Based on our design, multiple software frameworks can form a cluster in almost any combination of layouts. Any framework can call another framework to control the devices managed by the other framework.

In a typical software deployment environment, the framework may have a hierarchical layout that a lower layer framework instance, which manages a set of smart devices, may be deployed as a device driver of an upper layer framework instance.

In response to the request to the lower layer framework's API interface, lower layer framework instance may send its managed device objects information to upper layer framework instance. Then upper layer framework can manage the actual smart devices through the management interface of lower layer framework instance.

Another method of deployment is the device drivers may have a hierarchical structure, that we have a common protocol driver (M160) to manage different vendor's proprietary drivers (M170) as its dependencies. For example, in our implementation, we have a common Bluetooth LE driver that is able to discover all nearby Bluetooth LE devices, and match them to installed vendor proprietary drivers. In case of match, the common Bluetooth LE module would register vendor proprietary device objects to the framework. If it cannot find a match, the common Bluetooth LE module would collect all well-known information as defined by Bluetooth LE standard, such as device name, device type, and etc. This device would then be registered to the framework as a common Bluetooth LE device. By utilizing this design, we can achieve the maximum flexibility in managing all kinds of smart devices under different deployment environments.

Figure 5:
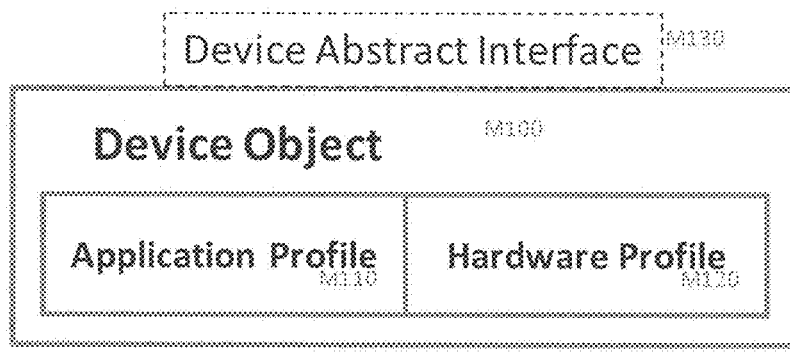
FIG. 5 is a modeling diagram depicting an embodiment of Device (M100) object managed by the framework.

FIG. 5 is a modeling diagram depicting an embodiment of Device Object (M100) managed by the framework.

The device object comprises of both an application profile (M110) and a hardware profile (M120).

The device application profile is a JSON format document. It represents the full capabilities of a device and how to operate them.

This JSON document is created by device driver (M150) who reads and analyzes the device at discovery phase to create framework internal object model for the device.

Clients of this framework, such as client apps, or third party web services may retrieve this JSON document through framework's external interface (M300) so they would know how to send action API calls to, or subscribe to event update from this device.

A hardware profile of the device comprises the internal implementation of how to operate the device and is invisible to the framework and external world.

The device object implements a set of common device abstract interface (M130), such as accepting device action API calls, and event subscription requests etc.

Framework may invoke this common interface to uniformly communicate with different types of devices no matter what their hardware profile would be.

Figure 6:
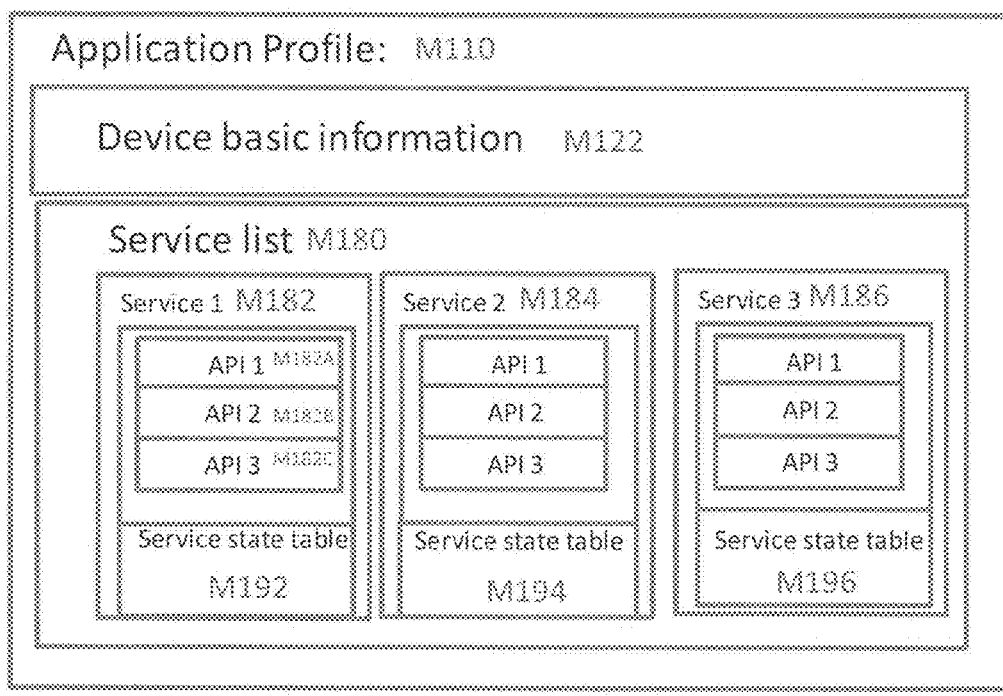
FIG. 6 is a modeling diagram depicting an embodiment of Device's application profile (M110), implemented in JSON format.

FIG. 6 is a modeling diagram further depicting an embodiment of the device's application profile (M110), implemented in JSON format.

Application profile comprises a list of the device's basic information (M122), such as device's vendor information, friendly name, and etc; and also a list, named as "service list" (M180) that defines the available services associated with the device.

Service list (M180) contains definitions of the list of services (M182, M184, M186). Each service contains a list of abstract APIs (M182A, M182B, M182C) and a list called "Service state table" (M192).

From functional perspective, the device application profile describes a list of services (M182, M184, M186) and each service contains definitions to a list of action calls (e.g. M182A, M182B, M182C).

Each action call definition includes a list of argument definitions that represent a full abstract API call interface.

In our implemented embodiments, serviceStateTable (M192, M194, M196), which contains definitions to a set of variables, are mapped to the arguments to the abstract API call interface. The definitions to these variables include information about their data types, and whether they can be evented.

Data type of variables can be either simple or complex type. Simple type includes string, integer, boolean, number, and consistent to JSON specification. The complex type is used to represent data objects with complex structure. By facilitating this, the client of this framework may send text messages representing the action API calls to framework according to the data types defined in the device model.

FIG. 7 is an example of this JSON document which represents a switchable light bulb, in accordance with an embodiment of the present invention.

The JSON document comprises the device's basic information, such as name, manufacturer info, and etc.; a list of services, where each service contains definitions to a list of actions, which each describes the action API calls this device supports.

By utilizing this JSON based device model and the above described process, client applications would have a uniform representation. With this uniform device application profile and abstract device interface, a light bulb which provide switch on-off functionality would have a uniform representation to clients regardless of the device's network protocol Service represents a set of individual and interchangeable functionalities provided by smart devices. For example, a dimmable light bulb may expose two services: one is switch on-off service; the other is the dimming service. The switch on-off service contains two abstract APIs to switch on or off the light bulb, and the dimming service contains two APIs to get and set the dimming level of the light bulb.

FIG. 8 is an example of JSON document which represents a light bulb with both switch and dimming functions. Comparing to the JSON example shown in FIG. 7, additional APIs are added to Service List to define the dimming service.

Furthermore, the defined service entity can be reused in other scenarios. For example, this switch on-off service entity can be used to describe the switching functionality exposed by other smart device, such as TV, washing machine and etc. The dimming service may also be used to describe dimmable TV or monitor screen.

The "Service state table" (M192) contains the variable definition which maps to each argument of the abstract APIs defined by the service.

The data type of the variables is defined in Service state table (M192) and can be either simple type (boolean, integer, number and string) or complex type which may contain complex data in JSON objects or arrays.

By utilizing this abstract API and variable type information, we can send the device's application profile to the clients outside the framework via framework "Restful" API interface (M310). Then the clients would know how to send the correct action API calls to control the device.

Furthermore, each variable's definition in "Service state table" may be annotated with a "sendEvents" boolean flag. Framework would cache the variable's latest known value, which are acquired from successful action calls or event updates, in its memory.

If a variable's "sendEvents" flag is true in device's application profile and the value of this variable is changed by underlying network stack or by action API calls, the framework would send event updates to its event subscribers. For example, if a user switch off a light bulb, all event subscribers would get update from framework for above changes. By doing this, we have a flexible bi-directional data channel between clients and IoT devices.

Figure 9:
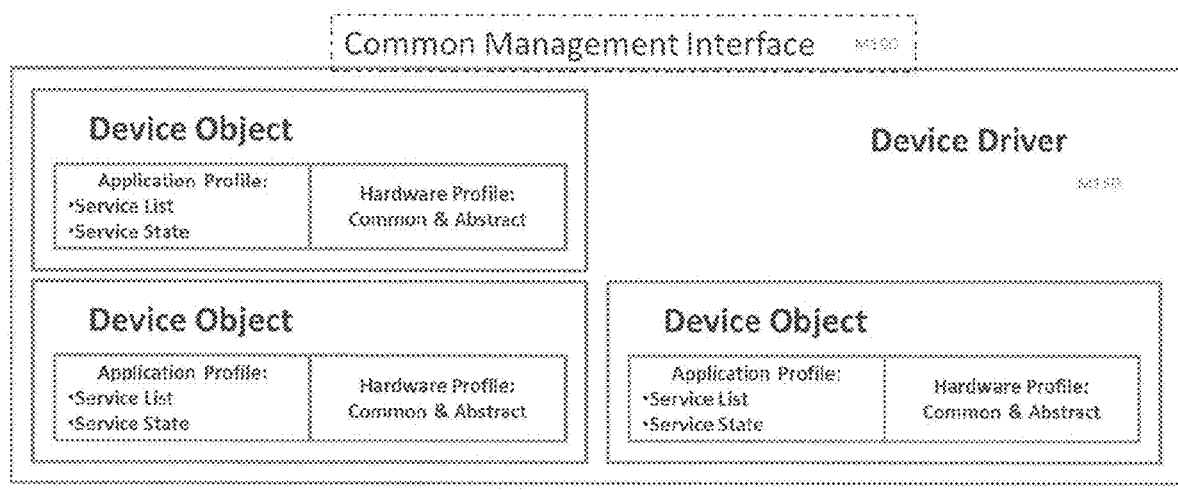
FIG. 9 is a modeling diagram depicting an embodiment of Device Driver (M150), further comprising of a set of device objects.

FIG. 9 is a modeling diagram depicting an embodiment of Device Driver (M150), further comprising of a set of device objects.

Each device driver represents a type of network protocol and may manage one or more device objects in that category, for example, Bluetooth, Z-Wave, ZigBee, ONVIF protocols would each take a device driver.

In addition, device manufacturer's non-standard, proprietary implementations can also be supported through the framework, and be presented to client side within this common abstract JSON based device application profile.

Each device driver has a common management interface (M190) exposes to framework.

Framework may manage device drivers, such as driver load and unload, start device discovery process through this interface (M190).

When receiving discovery request from framework, device driver would start device discovery process according to their own discovery protocols, for example Bluetooth or Z-Wave network scan, UPnP SSDP, WS-Discovery for ONVIF cameras etc. A device object would be generated for each newly discovered device, and registered to framework.

Figure 10:
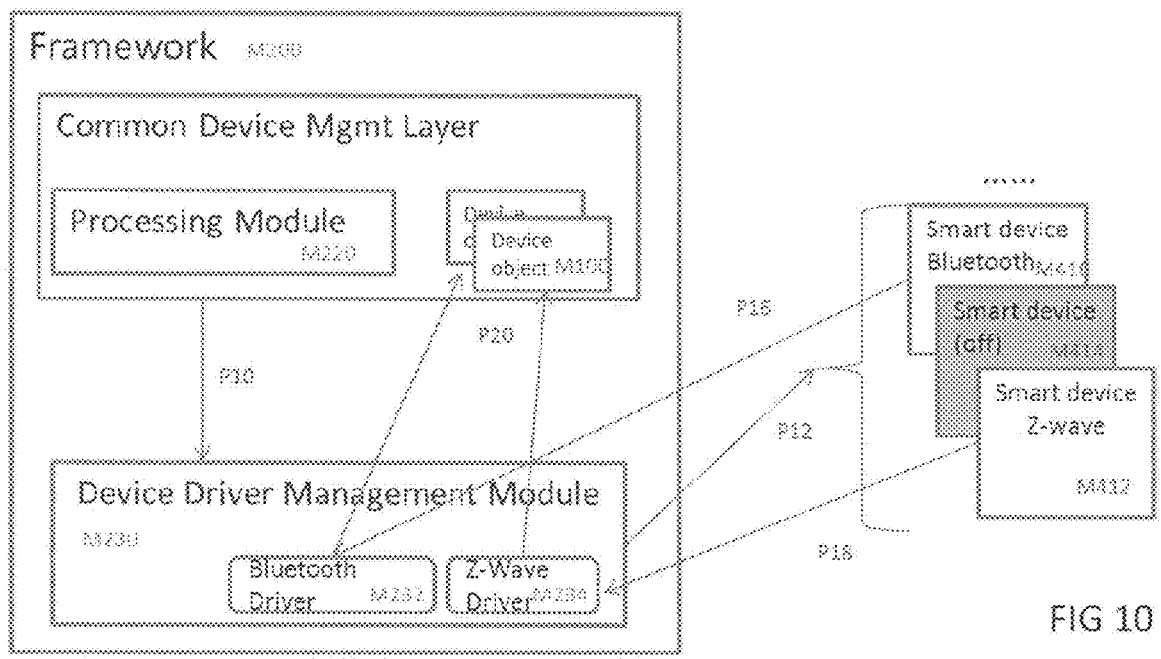
FIG. 10 is a flowchart of acts performed by the framework in discovering and registering a smart device, in accordance with an embodiment of the present invention.

FIG. 10 illustrates the process of framework to discover the device and available services.

The framework's processing module (M220) would invoke (P10) necessary device drivers (M232, M234) within the device driver management module (M230) to discover all connected IoT devices. Upon a discover requests (P12) are sent out, all available devices (M412, M416) on its network response to the respective device driver (P16, P18) per standard connection protocols.

The device driver (M232, M234) would register (P20) the discovered devices to framework by creating and presenting as framework internal device objects (M100 in FIG. 5). Each device object contains a device application profile (M110 in FIG. 5) of this smart device. This application profile is a document in JSON format with all information about the smart device and how to operate it.

Figure 11:
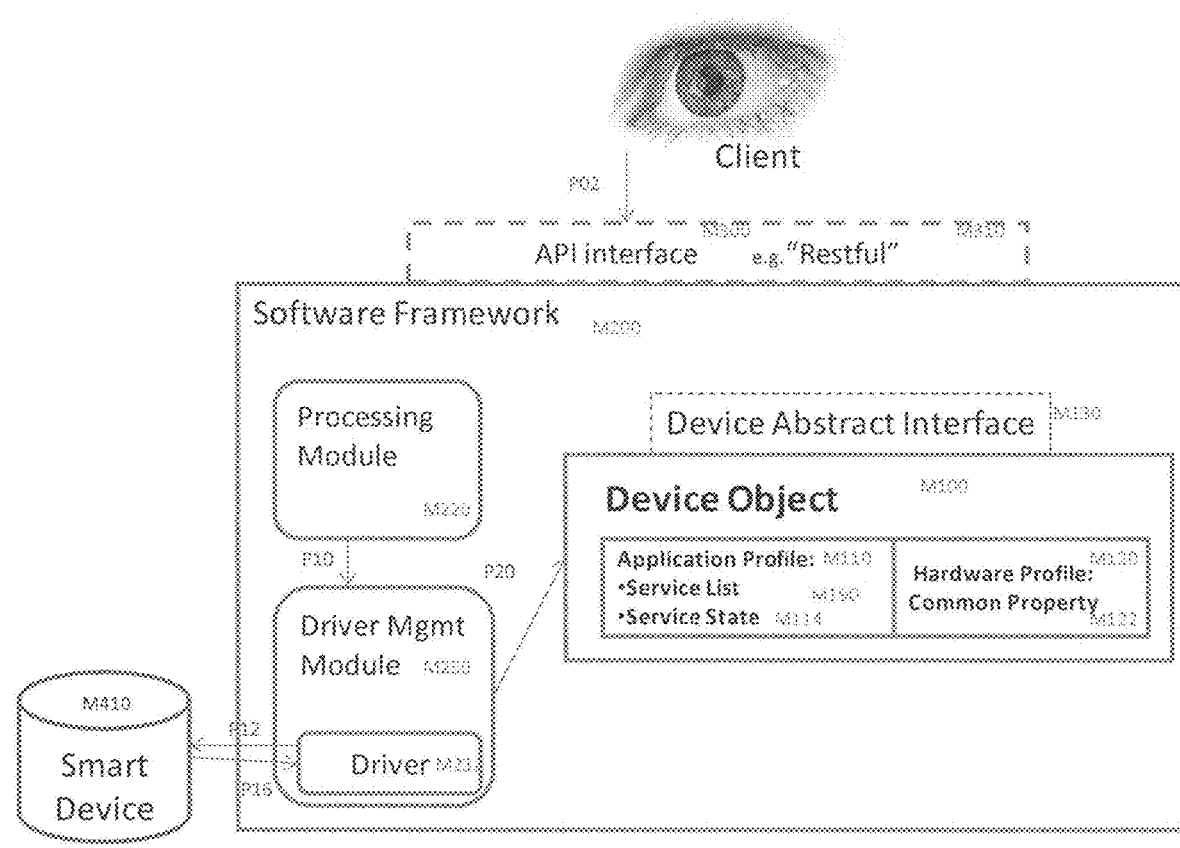
FIG. 11 is a modeling diagram depicting an example of how the framework to deliver a common abstract interface for the smart device.

FIG. 11 is a modeling diagram depicting an example of how the framework to deliver a common abstract interface for the smart device.

After framework is started, client may send device discover request (P02) to framework, framework processing module would send this request (P10) to device drivers within the driver management module. The driver would interact (P12 & P16) with smart device (M410) to complete the discovery process.

Upon discovery, the respective driver would register (P20) the discovered smart device to framework as a device objects (M100). With the common format of device object, we achieved a uniform representation of device with associated services.

Figure 12:
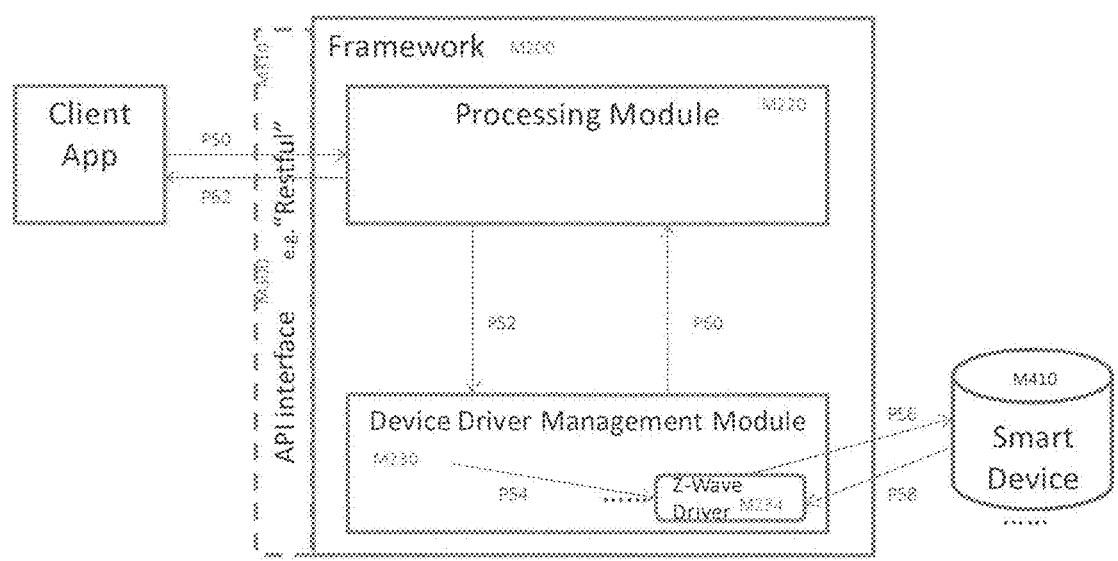
FIG. 12 is a flowchart of acts performed by the client app and the framework, interacting and controlling the smart device, in accordance with an embodiment of the present invention.

FIG. 12 illustrates the process of client app to control and interact with the smart device through the framework.

After receiving a device's application profile through framework's API interface (M300), a client app in the external world sends an action API call request in text messages (P50) to the framework's external API interface (M300).

The framework would then send API call data through device abstract interface (M130 in FIG. 5) to the respective underlying device driver (P52), where API call data would be translated to device's hardware profile and internal implementation inside the device object.

The framework would internally invoke the right driver, let's say, the Z-Wave driver (M234), to translate those API calls into device's own control protocols, let's say, Z-Wave protocol, to communicate (P56) with smart device (M410).

Upon the completion of action, the smart device sends acknowledgement or output data (P58) back to the driver, then to the framework's process module (P60) and the client app (P62) sequentially.

By utilizing this design, we have a common device application profile for each type of device to the external world. For example, a light bulb would expose only a switch on-off application profile to framework, then on-off API call data may be sent to the light bulb's device object through its device abstract interface (M130). Then this on-off API call would be translated into device object's hardware profile and its internal implementations no matter what communication protocols they are based on.

Figure 13:
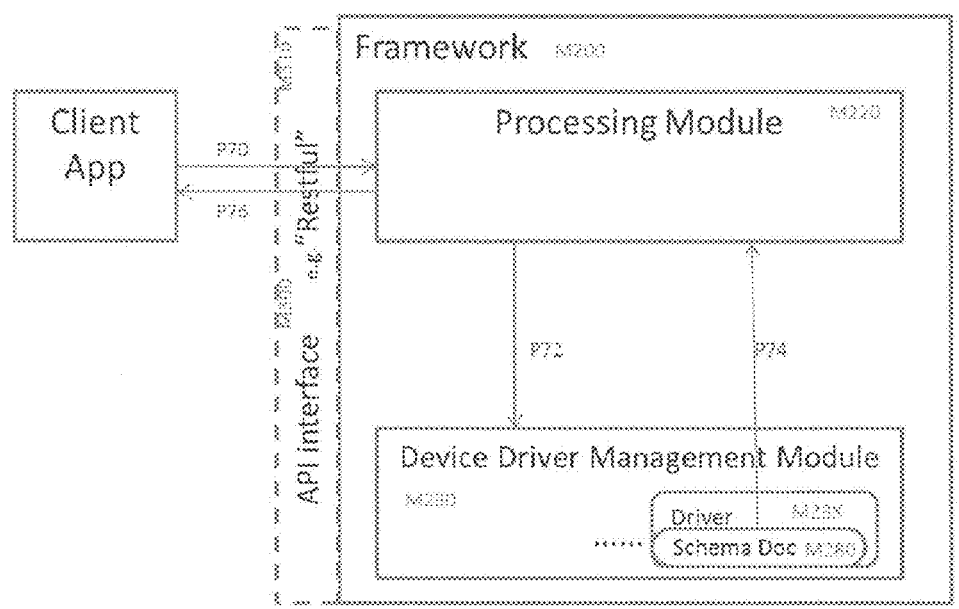
FIG. 13 is a flowchart of acts performed by a client app to retrieve a JSON schema document (M280) associated with the device object.

FIG. 13 is a flowchart of acts performed by a client app to retrieve a JSON schema document (M280) associated with the device object.

In our invention, each device object must carry a JSON schema document alongside of its application profile (M110 in FIG. 5) if any argument to its abstract API calls are in complex type.

When invoking a device's abstract API (M182A in FIG. 6), the actual data of the complex type can be either a JSON array or JSON object. This JSON schema document (M280) contains detail definitions to all complex type data exposed by device's abstract APIs (M182A in FIG. 6).

In device's application profile (M110 in FIG. 6), inside "Service state table" (M192 in FIG. 6), the variable definition which maps to a specific complex type argument of device's abstract API (M182A) includes a JSON pointer string, which refers to the sub-schema definition inside the JSON schema document (M280).

The framework would dereference this JSON pointer during runtime to validate input and output data in complex types.

The client application may retrieve the sub-schema definition associated with this JSON pointer from framework's RESTful API interface (M310) for pre-processing and validation purpose.

For example, client application may automatically generate input forms on its user interface according to the variable's schema definition. When handling device action API calls or event update data, Framework would validate all simple and complex type data according to their simple type and schema definition.

Figure 14:
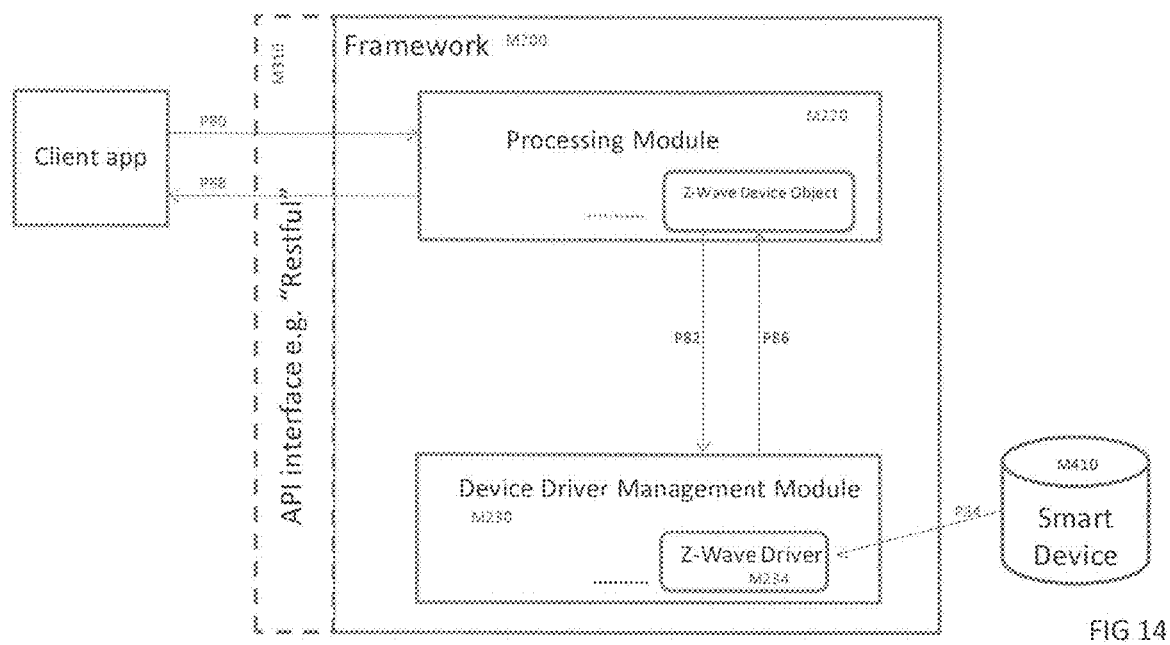
FIG. 14 is a flowchart of acts performed by the client app, and framework in interacting to do event subscription and receive event updates from the smart device, in accordance with an embodiment of the present invention.

FIG. 14 is a flowchart of acts performed by the client app, and framework in interacting to do event subscription and receive event updates from the smart device, in accordance with an embodiment of the present invention.

After discovery process, the device objects are registered to framework.

The client application may subscribe (P80) to device event updates by invoking framework's event subscription API interface.

The subscription information contains the device in interest and subscriber's address for receiving event updates.

After receiving event subscription request, framework dispatches the request to respective device object. The device object would send (P82) that request to its device driver.

During runtime, if any event update is generated from the smart device, the event data are sent (P84) to its device driver. After receiving event data, the device driver would dispatch (P86) it to the device object which is managed by the framework.

The framework would compare the new event data with the device object's internal cached value, which may be acquired from previous action calls or event updates. If there is a change, framework would broadcast (P88) an event update to its subscribers.

Furthermore, if an action API call changes any of the device state as defined in "Service state table" (M192 in FIG. 6), the framework would be aware of this because it caches those states inside its memory. In this case, framework also broadcasts event update to its subscribers.

Although preferred embodiments of the invention have been described herein, it will be understood by those skilled in the art that variations may be made thereto without departing from the spirit of the invention or the scope of the appended claims.

The invention claimed is:

1. A method of managing smart devices, comprising:
discovering one or more smart devices using device-specific protocols;
registering the one or more smart devices based on information received during the discovering and generating a device application profile for each of the one or more smart devices;
receiving, from a client apparatus, a command through a uniform common interface, said command being directed to one of the one or more smart devices, wherein the uniform common interface comprises a set of pre-defined Application Program Interfaces (APIs);
processing the command to generate a device-specific protocol message for the smart devices to which the command is directed; and
sending the device-specific protocol message to the smart device;
wherein the device application profile of each smart device is a document of JavaScript Object Notation (JSON) format, comprising:

a definition of complex type variable annotated with a schema keyword;

a JSON pointer, wherein a schema keyword definition of the JSON pointer refers to the complex type variable's schema definition and defines the complex type variable that can be retrieved via the set of pre-defined APIs by following the JSON pointer definition.

2. The method of claim 1, further comprising receiving, from the client apparatus, a subscription request for event updates, wherein the subscription request comprises a subscriber address and a specified smart device.

3. The method of claim 2, further comprising sending an event update to the client apparatus using the subscriber address when a device event occurs at the specified smart device.

4. The method of claim 1, wherein the registering of the one or more smart devices based on information received during the discovering comprises generating a device application profile for each of the one or more smart devices.

5. The method of claim 4, wherein the device application profile of each smart device comprises a list of services provided by the smart device.

6. The method of claim 5, wherein each service in the device application profile of each smart device includes a list of action calls representing functions performed by the smart device.

7. The method of claim 1, wherein the device-specific protocols include Bluetooth, ZWave, Zig Bee, or IP protocols.

8. A system for managing one or more smart devices, comprising:
a server configured to communicate with the one or more smart devices using device-specific protocols; and
a client apparatus configured to communicate with the server through a uniform common interface;
wherein the server is configured to:
discover one or more smart devices using one or more device-specific protocols;
register the one or more smart devices based on information received during the discovering and generating a device application profile for each of the one or more smart devices;
receive, from the client apparatus, a command through a uniform common interface, said command being directed to one of the one or more smart devices, wherein the uniform common interface comprises a set of pre-defined Application Program Interfaces (APIs);
process the command to generate a device-specific protocol message for the smart devices to which the command is directed; and
send the device-specific protocol message to the smart device;
wherein the device application profile of each smart device is a document of JavaScript Object Notation (JSON) format, comprising:
a definition of complex type variable annotated with a schema keyword;
a JSON pointer, wherein a schema keyword definition of the JSON pointer refers to the complex type variable's schema definition and defines the complex type variable that can be retrieved via the set of pre-defined APIs by following the JSON pointer definition.

9. The system of claim 8, wherein the server is further configured to receive, from the client apparatus, a subscription request for event updates, wherein the subscription request comprises a subscriber address and a specified smart device.

10. The system of claim 9, wherein the server is further configured to send an event update to the client apparatus using the subscriber address when a device event occurs at the specified smart device.

11. The system of claim 8, wherein the registering of the one or more smart devices based on information received during the discovering comprises generating a device application profile for each of the one or more smart devices.

12. The system of claim 11, wherein the device application profile of each smart device comprises a list of services provided by the smart device.

13. The system of claim 12, wherein each service in the device application profile of each smart device includes a list of action calls representing functions performed by the smart device.

* * * * *